United States Patent [19]

Burke et al.

[11] Patent Number: 4,936,150

[45] Date of Patent: Jun. 26, 1990

[54] STRAIN FOLLOWER

[75] Inventors: Andrew P. Burke, Cobb County, Colo.; Thomas A. Rak, Columbia County, Oreg.; Paul G. Anderson; John A. McMennamy, both of Cobb County, Ga.

[73] Assignee: Movats Incorporated, Kennesaw, Ga.

[21] Appl. No.: 209,425

[22] Filed: Jun. 21, 1988

Related U.S. Application Data

[63] Continuation-in-part of Ser. No. 41,006, Apr. 21, 1987, abandoned, which is a continuation of Ser. No. 36,024, Apr. 8, 1987, abandoned.

[51] Int. Cl.⁵ ............................................. G01B 5/00
[52] U.S. Cl. ..................................................... 33/788
[58] Field of Search ................ 73/761, 765, 772, 774, 73/777, 779, 780–782, 788, 790, 795, 862.62, 862.64–862.67, 862.49, 862.52, 862.32, 862.33, 862.35; 33/143 G, 143 L, 147 D, 148 D, 147 N, 787, 788; 338/6, 47

[56] References Cited

U.S. PATENT DOCUMENTS

| | | | |
|---|---|---|---|
| 753,015 | 2/1904 | Tretch | 73/782 |
| 2,099,662 | 11/1937 | Slonneger | |
| 2,198,041 | 4/1940 | Peters | |
| 3,295,365 | 1/1967 | Larrigan et al. | |
| 3,820,388 | 6/1974 | Fletcher et al. | |
| 4,251,918 | 2/1981 | Duggun | |
| 4,527,335 | 7/1985 | Meline | 33/147 D |
| 4,528,542 | 7/1985 | Meline | 338/6 |
| 4,543,837 | 10/1985 | Stern et al. | 338/6 |
| 4,570,903 | 2/1986 | Crass | |
| 4,619,147 | 10/1986 | Yoshimura et al. | 73/862.65 |
| 4,657,097 | 4/1987 | Griffen | 73/862.65 |
| 4,674,342 | 6/1987 | Ushijima et al. | 73/862.65 |

OTHER PUBLICATIONS

Measurements Technology Inc.–"Strain Transducers & Instrumentation Systems"–Booklet.
"Modern Strain Gage Transducers ... Their Design and Construction" Measurements Group Inc., Raleigh, N.C.–Booklet (See Esp. Part III).
SATEC Extensometers–Bulletin Ex–5016, SATEC Systems Inc., Grove City, Pa.
Engineering Data Sheet–Micro Measurements Division–Measurements Group Inc., "General Information: EA–Series Strain Gages".
Catalog 400–Measurements Group–"Strain Gage Listings 84".
M–Line Accessories Instruction Bulletin B–127-9, "Strain Gage Installations With M–Bond 200 Adhesive"–Measurement Group Inc., 1979.
The Center for Professional Advancement, "Strain Gage Measurements" Booklet.

Primary Examiner—Robert Raevis
Attorney, Agent, or Firm—Louis T. Isaf

[57] ABSTRACT

A Strain Follower comprises cantilevered beams mounted by gripping means on opposite sides of an object to be loaded, which beams are deflected in relationship to the deformation of the object by axial forces, and strain gages mounted on the beams and electrically within a wheatstone bridge circuit for providing an output representative of the axial deformation of the loaded object, while minimizing the impact, on the output by bending and torsional forces acting on the object.

23 Claims, 6 Drawing Sheets

STRAIN FOLLOWER

CONTINUATION-IN-PART

This application is a continuation-in-part of U.S. patent application Ser. No. 07/041,006, filed Apr. 21, 1987 now abandoned, which is a continuation of Ser. No. 07/036,024, filed Apr. 8, 1987 now abandoned.

FIELD OF THE INVENTION

The present invention relates generally to the field of strain follower devices and more specifically to devices (such as extensometers and compressometers) for the measuring of strain on a symmetrical bar.

BACKGROUND OF THE INVENTION

The strain follower industry is crowded with numerous designs of extensometers, compressometers and deflectometers each specifically designed to handle numerous conditions of static or dynamic testing, tension or compression, varying temperatures, specimen size and shape and other specific applications. Of the known strain followers available prior to the present invention, the vast majority of strain followers are utilized as laboratory instruments for use in controlled environments where large vibrations and abuses of the industrial workplace are avoided. Furthermore, the controlled laboratory environment subjects test specimens, typically, to purely axial loads (compression or tension) or to deflection imposed by forces moved through a single plane.

The industrial workplace does not represent such an easily controlled environment. Machine components are constantly exposed during operation to large vibrations; machine parts do not come in prepared, test specimen sizes of the laboratory; the magnitude of forces on machine components is not always controllable or predictable; machine components are subjected, often times, to combinations of axial forces, bending forces, torsional forces and deflection forces which are not always predictable.

While attempting to perform strain measurements and, thus, determine the amount of force exerted on the machine components of an operating machine within an industrial environment, at least some industrial users have found existing strain followers to be woefully inadequate in addressing the needs within the operating environment. Some particular problems include, but are not limited to: background noises which overshadow the output signals from the existing strain followers; excessive bending forces, especially in compression situations, which could not be compensated for by the existing strain followers; torsional forces acting on machine elements, which torsional forces can not be compensated for by the existing strain followers and, thus, complicate the measurement of pure axial strains. One example of an industrial application wherein preexisting strain followers appear to have proven inadequate, is the measurement of strain (for purposes of determining axial force) imposed upon a valve stem operating within a flow control system in a nuclear power plant.

A surprising and welcome step towards solving the problems experienced in the industrial environment was taken by the introduction of the Stem Strain Transducer which is the subject of the parent U.S. patent application to which this specification is a continuation-in-part. The Stem Strain Transducer provided inventive concepts which, at least, minimized the impact of torsional forces on measurements of axial strain; provided a practical approach to the compressive, bending forces realistically encountered in industrial operations; and introduced a rugged design capable of withstanding the industrial environment. Without detracting from the value of the Stem Strain Transducer and its inventive breakthroughs, the present invention has sought to improve upon the Stem Strain Transducer, especially in the manner in which this inventive strain follower compensates for background noise of the industrial environment and, in the low-end sensitivity of the present invented device.

SUMMARY OF THE INVENTION

Briefly described, the present invention comprises a strain follower apparatus which includes a rugged gripping mechanism for mounting the apparatus to symmetrical objects; and includes complimentary (symmetrically) displacement measuring elements in the form of cantilevered, binocular beams and plunger elements for deflecting the beam. Deflection of the beam by the respective plungers is a factor of the axial deformation of the particular, symmetrical objects being tested. The amount of deflection of each binocular beam is measured by a wheatstone bridge arrangement of properly placed strain gages which measures strain along the length of the beam. Sensitivity of the apparatus is enhanced by exact machining of the beam to specific dimensions of the preferred embodiment. The respective deflection measuring components are arranged relative to one another in a manner which uniquely prepares them to compensate for the effects of bending and/or torsional forces on the axial strains sought to be measured. The present invention further includes a signal conditioning device which converts the output signals of the displacement measuring devices to representative measurements of axial deformation, strain and/or axial forces imposed upon the object being measured. Associated with each of the deflection measuring elements is a preloading device which assists in minimizing the effects of environmental, operational and other background noises on the output of the invented apparatus.

It is, therefore, an object of the present invention to provide a strain follower which uniquely functions to measure compressive and tensile strain on machine components operating within the industrial workplace.

Another object of the present invention is to provide a strain follower and associated components for measuring actual forces imposed upon symmetrical objects, while minimizing the impact of bending and rotational forces on the axial measurement.

Still another object of the present invention is to provide an industrial grade strain follower which compensates for at least some of the background noise present in the industrial workplace.

Still another object of the present invention is to provide an improved stem strain transducer which is both rugged enough to function within the industrial workplace and sensitive enough to provide measurement of relatively low forces.

Other objects, features and advantages of the present invention will become apparent upon reading and understanding this specification, when taken in conjunction with the accompanying drawings.

DETAILED DESCRIPTION OF THE DRAWINGS

Figure 1:
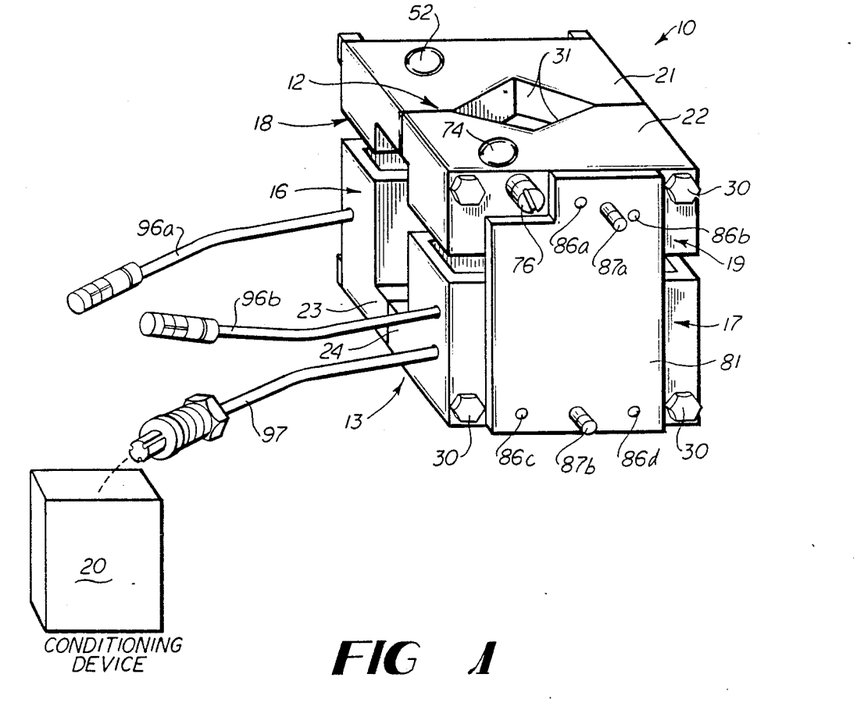
FIG. 1 is a perspective, front-right side view of a Strain Follower in accordance with a preferred embodiment of the present invention, showing a Strain Follower in the pre-assembled mode, but not mounted on an object to be measured.
Figure 2:
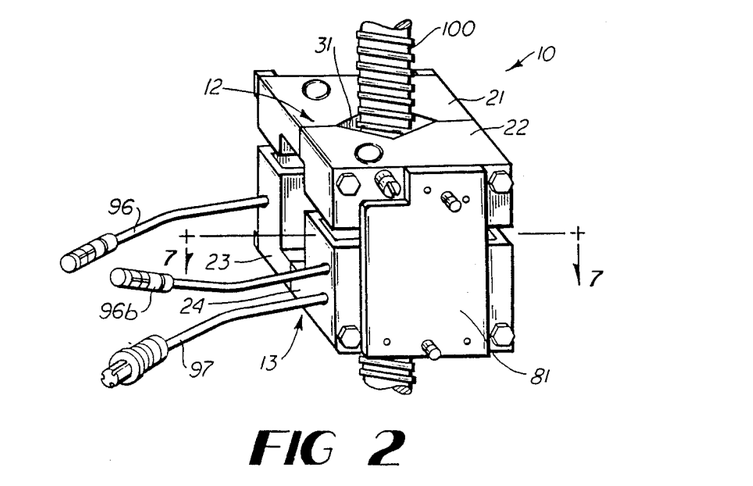
FIG. 2 is a perspective, front-right side view of the Strain Follower of FIG. 1, mounted to a threaded bar, and in the preassembled mode.

Referring now in greater detail to the drawings in which like numerals represent like components throughout several views, a strain follower 10 in accordance with a preferred embodiment of the present invention is seen in FIG. 1 as including an upper gripping member 12, a lower gripping member 13, a left beam/guage assembly 16, a right beam/gauge assembly 17, a left beam deflector assembly 18 and a right beam deflector assembly 19 and a signal conditioning device 20. The upper gripping assembly 12 is seen as including a left jaw member 21 and a right jaw member 22. Likewise, the lower gripping assembly 13 includes a left jaw member 23 and a right jaw member 24. Each of the jaw members 21–24 includes an abutment edge 27, a side edge 28 (opposite the abutment edge) and two, parallel, bolt channels 29 bored through the respective jaw member from the side edge 28 to the abutment edge 27. The abutment edge 27 of each jaw member 21-24 comprises an object engaging surface 31 defined between the respective bolt channels 29. The object engaging surfaces 31 of the disclosed embodiment are in the form of a "V". The shape of the object engaging surfaces 31 is varied, in alternate embodiments, to accommodate and appropriately grip an object of a select configuration. The "V" shape of the disclosed, object engaging surfaces 31 is deemed appropriate and preferred for an object in the configuration of a cylindrical shaft as shown (either smooth or threaded). It is preferred that the object engaging surfaces 31 of both the left jaw member 21 and right jaw member 22 of the upper gripping assembly 12 are of the same shape, with the same dimensions; and, furthermore, it is preferred that, with mounting bolts 30 passing through the bolt channels 29, the object engaging surfaces 31 of the upper gripping assembly 12 are symmetrical to a bisecting plane corresponding to the plane 32 drawn in FIG. 3. Likewise, the object engaging surfaces 31 of the left jaw member 23 and right jaw member 24 of the lower gripping assembly 13 are, preferably, identical in their shape and dimensions; and, when mounting bolts 30 are present through the bolt channels 29 of the lower gripping assembly 13, the object engaging surfaces 31 of the lower gripping assembly are, in the preferred embodiment, symmetrical about a bisecting plane oriented such as plane 32.

Figure 4:
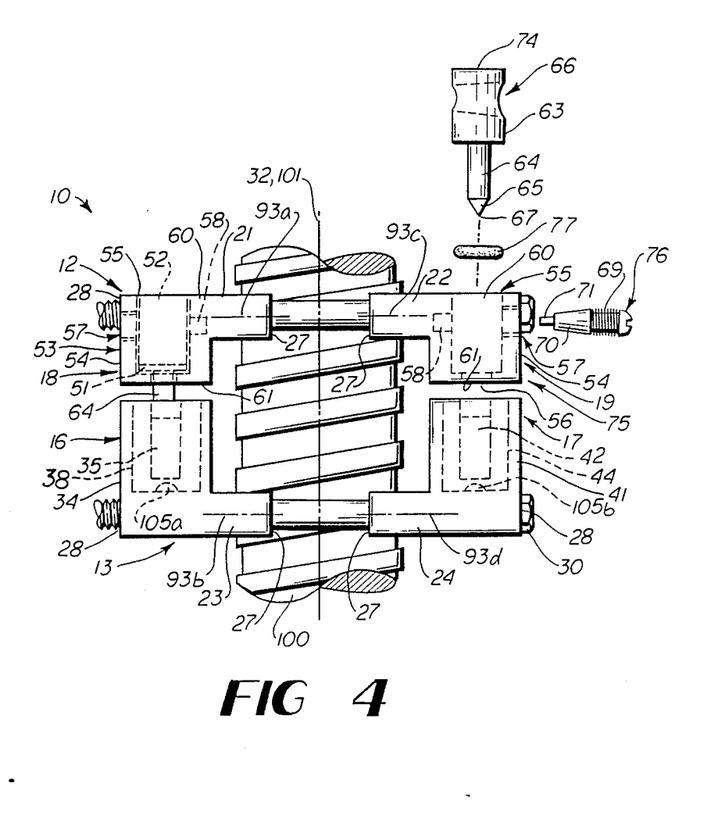
FIG. 4 is a front view of the Strain Follower of FIG. 1, mounted to a threaded bar, in the measuring mode, showing parts exploded.
Figure 5:
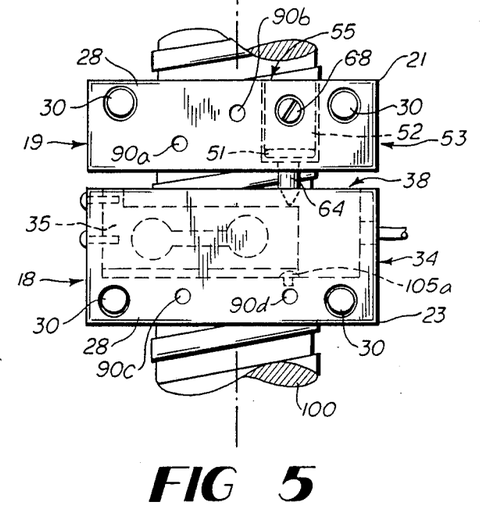
FIG. 5 is a left side view of the Strain Follower of FIG. 1 mounted in the measuring mode.
Figure 6A:
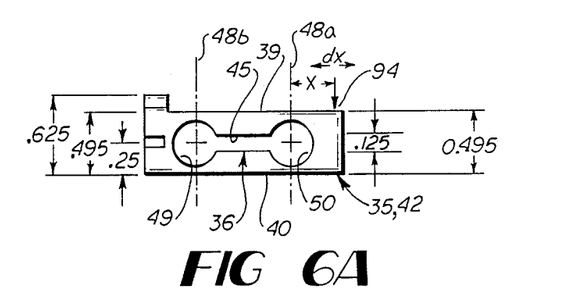
FIG. 6A is an isolated side view of a binocular beam in accordance with one preferred embodiment of the present invention.
Figure 6B:
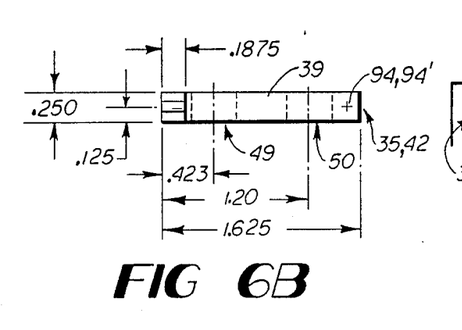
FIG. 6B is a top view of the beam of FIG. 6A.
Figure 7:
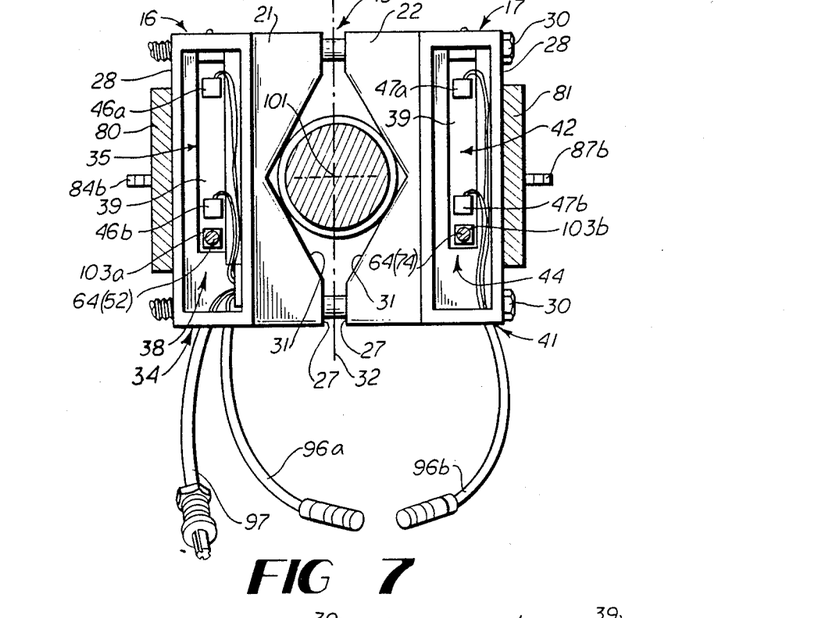
FIG. 7 is a cutaway top view of the mounted Strain Follower of FIG. 2, cutaway along line 7—7.

The left beam/gage assembly 16 is seen in FIGS. 4 and 5 as being mounted to the left jaw member 23 of the lower gripping assembly 13. A beam support structure 34 is seen attached to the lower jaw member 23. In the preferred embodiment, the support structure 34 is formed as an integral portion of the left jaw member 23. A beam 35 is supported in cantilevered fashion from the support structure 34. In the preferred embodiment, the beam 35 is of a beam structure known in the industry as a "binocular beam". With more detailed reference to FIG. 6A, the binocular beam of the preferred embodiment is seen from its side view as being an elongated, rectangular beam out of which is cut a segment 36 in the general shape of a dumbbell, as shown, having: a back, circular cut-out 49; a front, circular cut-out 50; and a rectangular, joining cut-out 45. In similar fashion, the right, beam/gage assembly 17 includes a beam support structure 41 which is mounted to the right jaw member 24 of the lower gripping assembly 13. The right beam 42 is, also, preferably a binocular beam 42 supported in cantilevered fashion from the support structure 41. In the preferred embodiment, the left beam 35 and right beam 42 are machined to be as close to identical as possible in size and configuration. In the preferred, best mode example at the time of this writing, the beams 35, 42 have the relative dimensions shown in FIGS. 6A and 6B, and are made of 2024 aluminum. The beams are mounted through their respective support structures 34, 41 to the respective jaw members 23, 24 in an orientation such that when the bolts 30 are occupying the bolt channels 29 of the jaw members 23, 24, the beams are parallel to one another and symmetrically located relative to the referenced, bisecting plane 32. (See, for example, FIG. 7.) With reference to FIGS. 5 and 7, the beam support structures 34, 41 of the herein disclosed, preferred embodiments, are formed in the shape of "troughs" 38, 44, thus shielding the beams 35, 42 from at least some of the environment. In alternate, preferred embodiments, the troughs 38, 44 are filled with silicon material covering the respective beam 35, 42.

Figure 8:
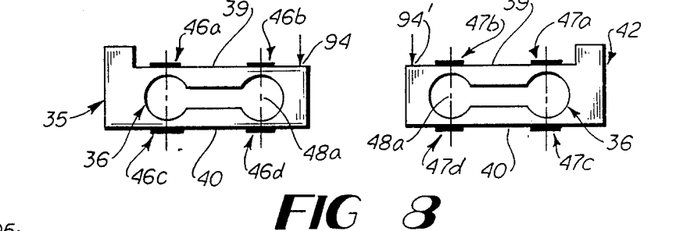
FIG. 8 is a representation of the two binocular beams used in accordance with a preferred embodiment of the present invention, showing placement of strain gauges.
Figure 9:
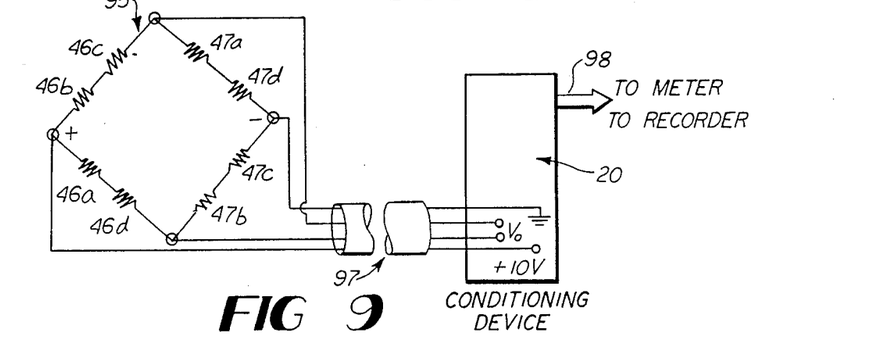
FIG. 9 is a schematic representation of the electrical circuit of the present invention.
Figure 10:
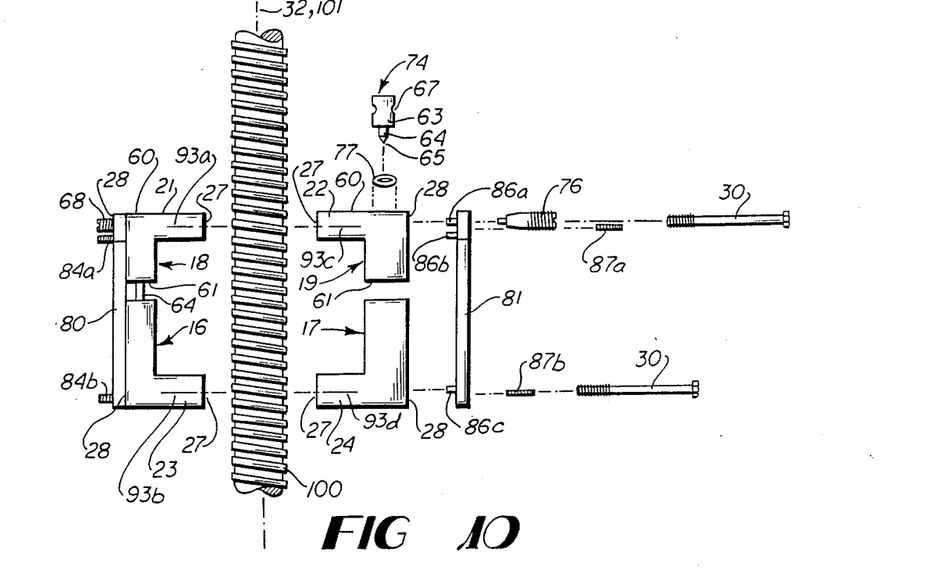
FIG. 10 is an exploded view of a Strain Follower of FIG. 1, showing a representation of the pre-assembled mode.

In the preferred embodiment, each of the beam/gage assemblies 16, 17 also includes four strain gages (46a–46d and 47a–47d, respectively) positioned along the outer edges of the respective beams 35, 42 at positions relative to the circular cut-outs 49, 50 of the dumbbell segment 36, as seen in the representation of FIG. 8. One example of an acceptable strain gauge for use as strain gauges 46a–46d, and 47a–47d is a gage known as a dual grid, single plane, openfaced, general purpose, constantan alloy, strain gage, (such as the EA-Series sold by Measurements Group, Inc., of Raleigh, N.C.) which is glued to the respective beam 35, 42 in a manner known in the industry. With reference to FIG. 9, it is seen that the eight strain gauges 46a–46d, 47a–47d are connected electrically in a wheatstone bridge 95 arrangement. Separable wires 96a, 96b are provided to allow for independent handling of the lower, left jaw member 23 and lower, right jaw member 24 during mounting, dismounting and transporting. The wires 96a, 96b are connected together during operation. See FIG. 7. Cable 97 conducts input power and output signal to and from the wheatstone bridge 95 and from and to the conditioning device 20. The conditioning device provides appropriate output 98 to meters, oscilloscopes, recorders, calculators or computers, or other such devices. Where appropriate, negative and positive sensing lead wires are added to the cable 97 for counteracting the effects of line losses of exitation voltage in cable 97.

Figure 3:
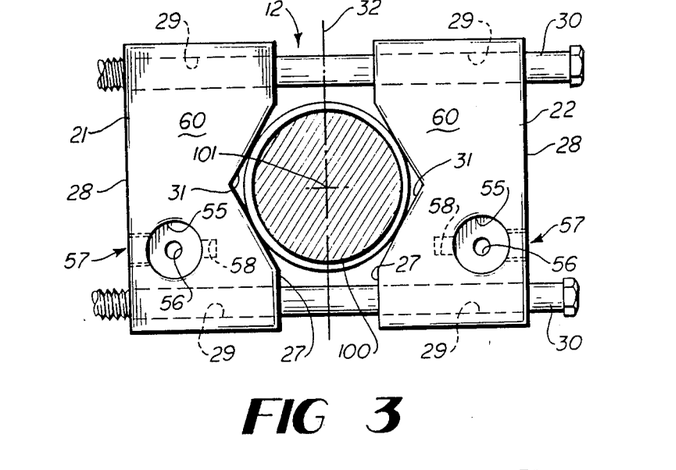
FIG. 3 is a top view of the Strain Follower of FIG. 1, mounted in the measuring mode.

The left beam deflector assembly 18 is seen in FIGS. 3, 4 and 5 as including a plunger 52 and a plunger support structure 53. The plunger support structure 53 is, in the herein disclosed, preferred embodiment, seen as being associated with and integrally formed as part of the upper, jaw member 21. The plunger support structure 53 includes a block portion 54 into which is bored a cylindrical cavity 55. The cavity 55 extends from the top edge 60 of the jaw member 21 toward the bottom edge 61, a majority of the way through the block portion 54. A cylindrical passage 56, concentrically aligned with the cavity 55, provides access to the cavity through bottom edge 61 of the jaw member 21. A threaded screw channel 57 is bored from the side edge 28 into the cavity 55 and a guide hole 58 is seen opposite to and concentrally aligned with the screw channel. The plunger includes a cylindrical body 63 of an outside diameter slightly less than the inside diameter of the cavity 55. The plunger also includes a cylindrical bar 64 protruding from the body 63 and defining a conical end 65. The cylindrical bar 64 is of a diameter slightly less than the diameter of the cylindrical passage 56 of the plunger support structure 53. A tapered passage 66 passes through the body 63 perpendicular to the cylindrical axis of the body. An O-Ring 51 occupies the cavity 55 and then the plunger 52 is held in the cavity 55 of the plunger support structure 53 with the cylindrical bar 64 extended through the cylindrical passage 56 and the tapered passage 66 aligned for access through the screw channel 57. Reference FIG. 5. A screw 68, referred to as the preload screw 68, occupies the threaded screw channel 57. The preload screw 68 includes a threaded portion 69 of uniform diameter, and a tapered portion 70 which engages the tapered passage 66 of the plunger 52, and a guide post 71 which contacts guide hole 58.

The right beam deflector assembly 19 includes a plunger support structure 75 formed as an integral part of the upper, right jaw member 22, a plunger 74, an O-ring 77 and a "preload" screw 76. The configuration and orientation of the components for the right beam deflector assembly 19 are similar to the corresponding components of the left beam deflector assembly 18. As seen in FIGS. 3 and 4, when the mounting bolts are inserted in the respective bolt channels 29 of the upper jaw members 21, 22, the left and right plunger support structures 53, 75 are, preferably, aligned symmetrically about the referenced bisecting plane 32.

The preferred embodiment of the strain follower 10 includes two spacer plates 80, 81. They shall be referred to as the left spacer plate 80 and the right spacer plate 81. These spacer plates 80, 81 are seen in FIGS. 1, 2, 7 and 10. The left spacer plate 80 includes four alignment pins 83a–83d which are pressfit, welded or otherwise fixedly attached to the spacer plate. Two jack screws 84a, 84b are threaded through the spacer plate 80 and are advanced in and out relative to the plate. The right spacer plate 81 includes alignment pins 86a–86d fixedly attached to the plate and jack screws 87a, 87b threaded through the plate. The left spacer plate 80 is associated with the left jaw member 21 of the upper gripping assembly 12 and the left jaw member 23 of the lower gripping assembly 13. The upper alignment pins 83a, 83b removably occupy alignment holes 90a, 90b of the upper, left jaw member 21, while the lower alignment pins 83c, 83d removably occupy alignment holes 90c, 90d in the lower, left jaw member 23. The right spacer plate 81 is associated with the right jaw member 22 of the upper gripping assembly 12 and the right jaw member 24 of the lower gripping member 13. The upper alignment pins 86a, 86b removably occupy alignment holes 91a, 91b in the upper, right jaw member 22, while the lower alignment pins 86c, 86d removably occupy the alignment holes 91c, 91d in the lower, right jaw member 24. Each spacer plate 80, 81 is particularly customized for association with the respective jaw members. That is, the left spacer plate 80 is customized for association with the left side jaw members 21, 23; and the right spacer plate 81 is customized for association with the right jaw members 22, 24. The customization referred to herein provides that when the left spacer plate 80 is mounted to the left jaw members 21, 23, with the alignment pins 83a–83d occupying their respective alignment holes 90a–90d, the left jaw members are rigidly maintained, relative to one another, to define a preestablished distance ("L") between the center plane 93a of the object engaging surface 31 of the upper, left jaw member 21 and the center plane 93b of the engaging surface 31 of the lower, left jaw member 23. Similarly, when the right spacer plate 81 is mounted to the right side jaw member 22, 24, with the alignment pin 86a–86d occupying the alignment holes 91a–91d, the right side jaw members 22, 24 are rigidly maintained relative to one another to define the same preestablished distance ("L") between the center plane 93c of the object engaging surface 31 of the upper right jaw member 22 and the center plane 93d of the object engaging surface 31 of the lower right jaw member 24. This preestablished distance "L" is referred to as the "gauge length".

Operation. The following is an example of at least one method of operation utilizing the preferred embodiment of the strain follower 10 in accordance with the present invention. The left beam/gauge assembly 16, right beam/gauge assembly 17, left beam deflector assembly 18 and right beam deflector assembly 19 are mounted to their respective upper and lower gripping assemblies 12, 13 in the manner described previously. The strain follower 10 is, then, pre-assembled with the left spacer plate 80 mounted to the left side jaw members 21, 23 and the right spacer plate 81 mounted to the right side jaw members 23, 24. The herein disclosed embodiment of the strain follower 10 is shown in its "pre-assembled mode" in drawing FIGS. 1, 2, 7 and 10. It is noted that, when these spacer plates 80, 81 are mounted on their respective jaw members, the jack screws 84, 87 have been retracted, away from the jaw member, in order that the spacer plate may be moved flush against the respective jaw members. The pre-assembled, aligned, left side jaw members 21, 23 and pre-assembled, aligned, right side jaw members 22, 24 are then mounted to an object 100 on which the strain (tension or compression) is to be measured. The object to be measured is seen, in the example of the drawings, as a threaded shaft 100. Mounting is accomplished by orienting the pre-assembled, left side jaw members 21, 23 and the pre-assembled, right side jaw members 22, 24 with the shaft 100 positioned between them (see FIG. 10) and with the upper jaw members 21, 22 aligned with one another and the lower jaw members 23, 24 aligned with one another. Mounting bolts 30 are extended through the bolt channels 29, as seen in the drawings, and tightened with nuts or other threaded elements to draw the corresponding left and right jaw members together, thus gripping the shaft 100 between the corresponding jaw members, in the manner of a vice. Preferably, the mounting bolts 30 function, in cooperation with the chosen, threaded elements, and by virtue of close tolerance between the bolts and bolt channels 29 as alignment bolts for the purpose of maintaining uniform spacing along adjacent abutment edges 27 of the respective upper gripping assemblies 12 and lower gripping assemblies 13.

After the gripping assemblies 12, 13 have been tightly bolted about the shaft 100, the spacer plates, 80, 81 are removed from their respective jaw members 21-24. The spacer plates 80, 81 are removed by screwing the jack screws 84a, 84b, 87a, 87b into and through the respective plate whereby the jack screws contact the side edges 28 of their respective jaw members and push or "jack" the spacer plate away from the jaw members, until the alignment pins 83, 86 have pulled clear of the alignment holes 90, 91. It is now seen that the strain follower 10 is mounted to the shaft 100 with the upper gripping assembly disconnected from to the lower gripping assembly; and the upper and lower gripping assemblies are moveable relative to oneanother, upon compression, extension, bending and/or twisting of the shaft segment between the gripping assemblies. The achievable relative movement is in, at least, both axial (toward and away) and angular directions. The axial and angular directions referred to are with respect to the cylindrical axis 101 of the shaft 100. This shall sometimes be referred to as the "Measuring Mode"; and the embodiment of the drawings is seen in the measuring mode in FIGS. 3, 4 and 5. With the spacer plate removed, and prior to any compressive or tensile forces on the shaft 100, the upper gripping assembly 12 and lower gripping assembly 13 define the pre-established gauge length "L"

between the respective upper center planes 93a, 93c and lower center planes 93b and 93d.

Figure 6C:
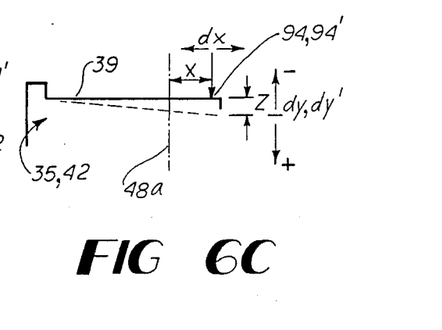
FIG. 6C is a representative view of the beam of FIG. 6A, showing some referenced distances.

With reference to FIGS. 5 and 7, the relative orientation of the plunger 52, supported from the upper, left jaw member 21 and the binocular beam 35, supported from the lower, left jaw member 23 is seen. With no torsional forces acting on the shaft 100, the plunger tip 67 strikes the top edge 39 of the beam at a distance "x" from the center line 48a of the front, circular cutout 50 of the beam 35. (See FIGS. 6A and 6C.) The point at "x" shall be termed the "Standard Strike point" 94. The relative position of the plunger 74 and beam 42 of the right, beam/gauge assembly 17 is similar to that expressed for the left beam/gauge assembly 16, with the tip 67 of the right plunger 74 striking (the Standard Strike point 94′) the top edge 39 of the right beam 42 at a distance "x" from the center line 48a of the front cut-out 50 of the right beam. It is seen that, preferably, strike platforms 103a, 103b are glued or otherwise attached to the top edge 39 of the respective beams 35, 42 at the location of (and larger than) the standard strike point 94, 94′. These platforms 103a, 103b are, preferably, of hardened steel which is harder than the plunger tip 65 (which is, preferably, of mild steel) and assist in preventing "pitting" of the beams. Prior to the imposing of any compression or tension forces on the shaft 100, the user pre-loads the binocular beams 35, 42. This is accomplished by screwing the preload screw 68, 76 of the respective beam/gauge assemblies 16, 17 inward such that the tapered portion 70 of the screw 68 engages the tapered passage 66 of the plunger body 63 to gradually force the plunger downward against the O-rings 51, 77. As the plunger moves downward, it presses on the respective beams 35, 42 to deflect the beam a desired amount "z". The amount of pre-load deflection is as desired by the user; however, it is preferred that sufficient pre-load deflection is developed in order to minimize the effect on the instrument from most background noises and/or to provide the beams 35, 42 with sufficient movement in both axial directions to recognize both compression and tension on the shaft 100. The strain gauges 46a–46d, 47a–47d provide an indication of the strain on the respective beam 35, 42, at the gauge locations, as result of the deflection of the beam. The preload deflection "z" results in an output (Vo) from the wheatstone bridge 95. The conditioning device 20 is adjusted such that the user observed output 98 is "zeroed" after preload.

With the upper gripping assembly 12 and lower gripping assembly 13 now mounted to the shaft 100 in the measuring mode and the beams preloaded, axial forces are now exerted on the shaft 100. It can be seen that, for example, as the shaft 100 is compressed, the upper jaw members 21, 22 will move closer to the lower jaw members 23, 24 effecting a "change in gauge length" ("dL"). Through action of the plungers 52, 74, the change in gauge length (dL) is reflected as a deflection "dy" and "dy′" of the respective beams 35, 42. Adjustable limit screws 105a, 105b are provided at the bottom of the respective troughs 38, 44, aligned under the Standard Strike point 94, 94′ at the free end of the beam 35, 42 to protect the beam from plastic deformation. The change in deflection of the beams 35, 42 results in a change in the relative resistance of the respective strain gauges 47a–47d, 46a–46d and, thus, results in a change in output (Vo) from the wheatstone bridge 95. The output (Vo) from the wheatstone bridge provides a voltage representation of dL, the change in gauge length. Presently, the correlation of output voltage (Vo) to the change in gauge length (dL) is determined empirically. This is done by selectively deflecting the beams 35, 42 by given, known and equal amounts dy, dy′, which dy and dy′ are measured at the standard strike point 94, 94′ of the beam (such that dy=dy′=dL), and recording the bridge output (Vo) for the given dy, dy′. Vo data is taken at a series of dy=dy′ points and then a relationship is established for extrapolating a dL for any Vo during field use. It can be seen that pure compressive forces on the shaft 100 result, typically, in increased dy and dy′ of approximately equal amounts (dy=-dy′=dL); purely tension forces on the shaft 100 will, typically, result in −dy and −dy′ of approximately equal amounts ($-dy=-dy'=dL$); bending forces will, generally, result in unequal and/or even opposite dy and dy'. The effect of torsional forces acting on the shaft 100 are minimized in the disclosed, binocular beam design by cancelling-out action of the two beam/gauge assemblies 16, 17. That is, it is noted that as the shaft 100 experiences torsion, the plunger tip 67 of one beam/gauge assembly will move a distance dx away from the beam, front cutout center line 48a (+dx) and the plunger tip 67 of the other beam/gauge assembly will move a distance dx' toward the respective front cutout center line 48a (−dx'), thus tending to cancel each other out.

The signal conditioning device 20, as mentioned above, provides power for the wheatstone bridge circuit 95 and receives the bridge output (Vo). Also the conditioning device 20, for example, amplifies and otherwise conditions the bridge output (Vo) for delivery along cable 98 to a device such as an oscilloscope.

Figure 11A:
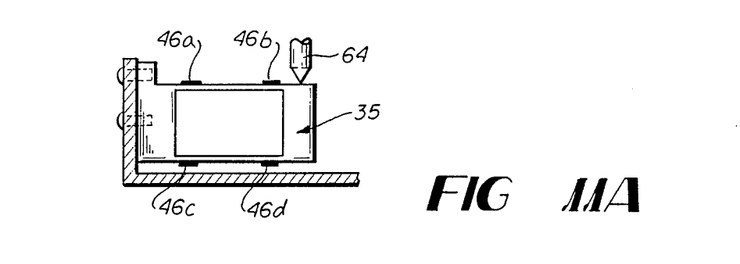
FIGS. 11A and 11B are isolated views of cantilevered beams for use in alternate embodiments of the present invention.
Figure 11B:
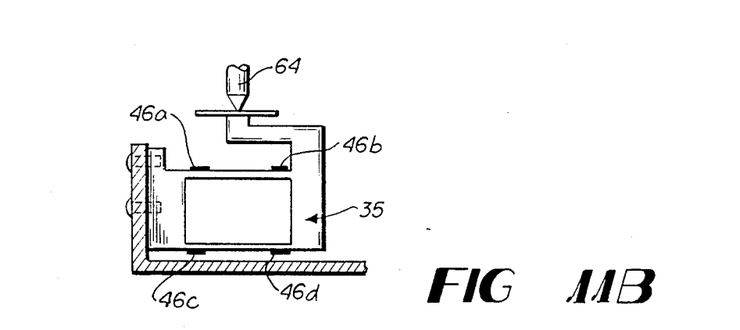

The preferred embodiment of the present invention provides for cantilevered beams 35, 42 as components of the beam/gauge assemblies 16, 17; and, in the previously disclosed, preferred embodiment, the cantilevered beams are binocular beams designed and used in the manner described above. However, the use of at least two other cantilevered beam designs is contemplated by alternate embodiments, which alternate beam designs are seen in FIGS. 11A, 11B.

Figure 12A:
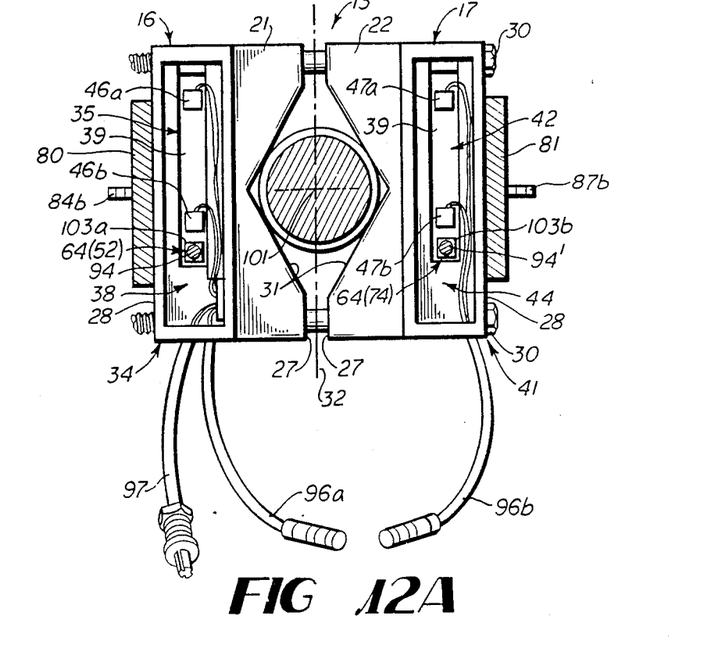
FIG. 12A is a cutaway top view of a mounted strain follower of FIG. 2, showing an alternate embodiment to that of FIG. 7.
Figure 12B:
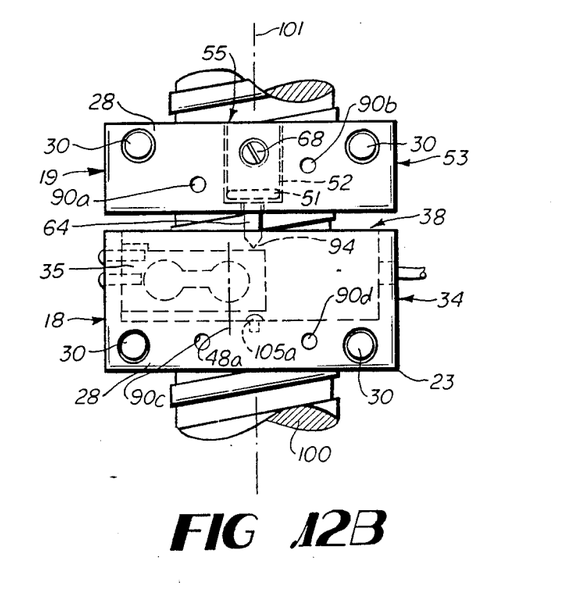
FIG. 12B is a left side view of the strain follower of the alternate embodiment of FIG. 12A.

Whereas, the herein disclosed preferred embodiment provides for the standard strike points 94, 94' to lie together in a plane offset from the central axis 101 of the object 100 (see top view of FIG. 7), an alternate, preferred embodiment provides for a larger strain follower 10 structure and re-positions the plungers 52, 75 and beams 35, 42 in order that the standard strike points 94, 94' are coplanar with the central axis 101 of the shaft as seen, by way of example, in FIGS. 12A and 12B.

Whereas, the present invention is described herein in detail with specific reference to preferred embodiments thereof, it will be understood that variations and modifications can be effected within the spirit and scope of the invention as described hereinbefore and as defined in the appended claims.

We claim:

1. An apparatus or monitoring the axial deformation in a stem or other symmetrical object which is subjected to a load, said apparatus comprising:
   first gripping member positioned along the object;
   second gripping member cooperating with said first gripping member to releasably and tightly grip the object between them;
   third ripping member positioned along the object at a position axially displaced from said first gripping member;
   fourth gripping member cooperating with said third gripping member to releasably and tightly grip the object between them;
   wherein said first and third gripping members move relative to one another in response to forces acting on the object, and wherein said second and fourth gripping members move relative to one another in response to forces acting on the object;
   first movement detecting means for detecting the axial component of the relative movement between said first and third gripping members, said first movement detecting means comprising, at least, a first beam mounted in cantilevered fashion to said first gripping member, a first plunger mounted to said third gripping member and contacting said first beam so as to bend said first beam in response to relative movement between said first and third gripping members, and means responsive to bending of said first beam for effecting a signal representative of said axial component of the relative movement between said first and third gripping members; and
   second movement detecting means for detecting the axial component of the relative movement between said second and fourth gripping members, said second movement detecting means comprising, at least, a second beam, which second beam is mounted in cantilevered fashion to said second gripping member, a second plunger which second plunger is mounted to said fourth gripping member and contacts said second beam so as to bend said second beam in response to relative movement between said second and fourth gripping members, and means responsive to bending of said second beam for effecting a signal representative of said axial component of the relative movement between said second and fourth gripping members.

2. Apparatus of claim 1, wherein said means of effecting a signal comprises, at least, strain gages mounted physically to the respective said beam and connected electrically as resistance within a wheatstone bridge.

3. Apparatus of claim 2, wherein said strain gauges of both said first and said second movement detecting means are connected electrically as resistance within the same Wheatstone Bridge, whereby the electrical output of said Wheatstone Bridge is representative of the axial deformation of the object.

4. Apparatus of claim 1, further comprising means for combining said signals effected by each said movement detecting means, whereby the combined signals result in an output representative of the axial deformation of the object.

5. Apparatus of claim 1, further comprising preload means for establishing a reference signal representative of an initial beam bending of each of said first beam and said second beam, prior to deformation of the object; and wherein each said means for effecting a signal in response bending of each of said first beam and said second beam comprises, at least, means for altering said reference signal.

6. Apparatus of claim 1, wherein said first beam comprises a first planar striking surface and said first plunger is mounted in contact with said striking surface, said first plunger and said first beam being supported relative to one another so as to enjoy freedom of movement relative to one another in all directions parallel of the plane of said striking surface; and wherein said second beam comprises a second planer striking surface and said second plunger is mounted in contact with said striking surface, said second plunger and said second beam being supported relative to one another so as to enjoy freedom of movement relative to one another in all directions parallel to the plane of said striking surface.

7. Apparatus of claim 6, further comprising:
   first bolting means for releasably bolting said first and second gripping members together to tightly grip the object between them; and
   second bolting means for releasably bolting said third and fourth gripping members together to tightly grip the object between them;

said first and second gripping members being connected to said third and fourth gripping members only through the object which they are gripping.

8. Apparatus of claim 1, further comprising:
first bolting means for releasably bolting said first and second gripping members together to tightly grip the object between them; and
second bolting means for releasably bolting said third and fourth gripping members together to tightly grip the object between them;
said first and second gripping members being connected to said third and fourth gripping members only through the object which they are gripping.

9. Apparatus of claim 1, wherein said first and third gripping members are capable of relative movement relative to one another in each of the axial, radial and angular directions in response to forces acting on the object; and wherein said second and fourth gripping members are capable or relative movement relative to one another in each of the axial, radial and angular directions in response to forces acting on the object; and wherein said first movement detecting means and said second movement detecting means are each so comprised as to not inhibit said independent relative movement of said gripping members in each of the radial and angular directions, whereby freedom of movement is available between said first and third gripping members and between said second and fourth gripping members for at least some distance in each of the axial, radial and angular directions and whereby axial deformation of the object is measurable while the stem is experiencing any and/or all of axial, bending and torsional forces.

10. Apparatus of claim 1, wherein said signal effected by both of said first and said second movement detecting means is a single, combined signal, whereby the combined signal results in an output representative of the axial deformation of the object.

11. An apparatus for monitoring the axial deformation in a stem or other object which is subjected to a load, said apparatus comprising first and second cantilevered beams releasably mounted by object gripping means on opposite sides of the object to be loaded, means for separately bending each said beam in relationship to the deformation of the object, and means responsive to said bending of both said first and second beams for representing the axial deformation of the object subjected to load.

12. Apparatus of claim 11, wherein said gripping means, by which said first and second cantilevered beams are mounted, releasably and tightly grip the object to be loaded.

13. Apparatus of claim 11, wherein said means responsive to said bending comprises at least one strain gage mounted physically to each of said first and second cantilevered beams, said strain gages on both beams being connected electrically as resistance within a single Wheatstone Bridge, whereby the electrical output of said Wheatstone Bridge is representative of the axial deformation of the object subjected to load.

14. An apparatus for monitoring the axial deformation in a stem or other symmetrical object which is subjected to a load, said apparatus comprising:
first gripping means positioned along the object for releasably and tightly gripping the object between them;
second gripping means, positioned along the object at a position axially displaced from said first gripping means, for releasably and tightly gripping the object between them,
wherein said first and second gripping means move relative to one another in response to forces acting on the object; and
first movement detecting means for detecting the axial component of the relative movement between said first and second gripping means, said first movement detecting means comprising, at least, a first beam mounted in cantilevered fashion to said first gripping means, a first plunger mounted to said second gripping means and contacting said first beam so as to bend said first beam in response to relative movement between said first and second gripping means, and means responsive to bending of said first beam or effecting a signal representative of said axial component of the relative movement between said first and second gripping means.

15. Apparatus of claim 14, wherein said means of effecting a signal comprises, at least, strain gages mounted physically to the respective said beam and connected electrically as resistance within a Wheatstone Bridge.

16. Apparatus of claim 14, further comprising preload means for establishing a reference signal representative of an initial beam bending of said first beam, prior to deformation of the object; and wherein said means for effecting a signal in response to bending of said first beam comprises, at least, means for altering said reference signal.

17. Apparatus of claim 14, wherein said first beam comprises a first planer striking surface and said first plunger is mounted in contact with said striking surface, said first plunger and said first beam being supported relative to one another so as to enjoy freedom of movement relative to one another in all directions parallel to the plane of said striking surface.

18. Apparatus of claim 17, wherein said first and second gripping means are connected only through the object which they are gripping.

19. Apparatus of claim 14, wherein said first and second gripping means are connected only through the object which they are gripping.

20. Apparatus of claim 14, wherein said first and second gripping means are capable of relative movement relative to one another in each of the axial, radial and angular directions in response to forces acting on the object; and wherein said first movement detecting means is so comprised as to not inhibit said independent relative movement of said gripping means in each of the radial and angular directions, whereby freedom of movement is available between said first and second gripping means for at least some distance in each of the axial, radial and angular directions and whereby axial deformation of the object is measurable while the object is experiencing any and/or all of axial, bending and torsional forces.

21. An apparatus for monitoring the axial deformation in a stem or other object which is subjected to a load, said apparatus comprising a cantilevered beam releasably mounted by object gripping means on to the object to be loaded, means for bending said beam in relationship to the deformation of the object, and means responsive to said bending of said beam for representing the axial deformation of the object subjected to load.

22. Apparatus of claim 21, wherein said object gripping means, by which said cantilevered beam is mounted, releasably and tightly grips the object to be loaded.

23. Apparatus of claim 21, wherein said means responsive to said bending comprises one strain gage mounted physically to said cantilevered beam, said strain gage being connected electrically as resistance within a Wheatstone Bridge, whereby the electrical output of said Wheatstone Bridge is representative of the axial deformation of the object subjected to load.

* * * * *